Figure 1:
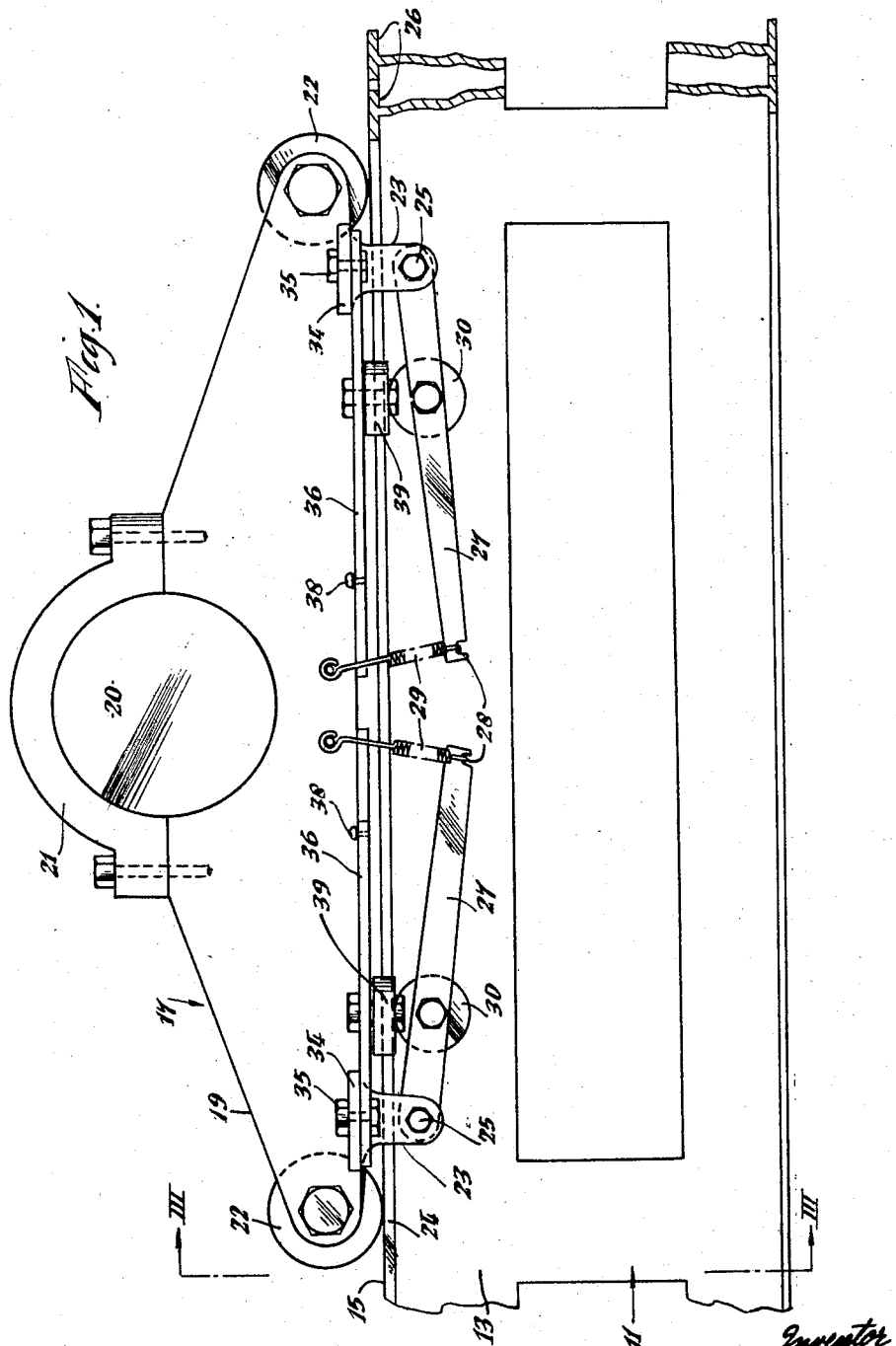

Nov. 11, 1958   R. P. J. SHORT   2,860,014
MACHINE TOOL GUIDING MEANS

Filed Nov. 15, 1954   3 Sheets-Sheet 3

Inventor
Richard Percy Jasper Short
by Albert Jacobs
Attorney

United States Patent Office 2,860,014
Patented Nov. 11, 1958

2,860,014

MACHINE TOOL GUIDING MEANS

Richard Percy Jasper Short, Bogota, Colombia

Application November 15, 1954, Serial No. 468,882

4 Claims. (Cl. 308—6)

This invention relates to means for guiding a machine tool along a straight path.

In some machine tools, for example, sawing machines, it is required to cause the tool to travel along a straight track whilst it operates upon a workpiece. Whilst it is possible to make a track member, for example, a beam or a table, having a perfectly straight track, such members are very expensive to make, by reason of the time and skill required to make guiding surfaces perfectly straight and parallel to each other.

The object of the present invention is to provide improved means for guiding a machine tool, which means are comparatively easy and cheap to make and use.

Guiding means according to this invention comprises a carrier adapted for a machine tool to be mounted thereon, a first set of rollers rotatably mounted in fixed positions on parallel axes on the said carrier and adapted all to roll on a first planar surface on a track member, a first set of bearing members resiliently mounted on said carrier and providing axes which are parallel with the axes of said first set of rollers, a second set of rollers rotatably mounted on the axes provided by said first set of bearing members, one roller to each bearing member, the rollers of said second set thereof being adapted to roll on a second surface of said track member which is substantially parallel to said first planar surface, said first planar surface and said second surface being opposed faces of a part of said track member which provides compression reaction between said faces, a third set of rollers rotatably mounted on parallel axes in fixed positions on the said carrier, the axes of said third set of rollers being perpendicular to the axes of said first set of rollers, said third set of rollers being adapted to roll on a third planar surface on the said track member which third planar surface is perpendicular to said first planar surface, a second set of bearing members resiliently mounted on said carrier and providing axes which are parallel with the axes of said third set of rollers, a fourth set of rollers rotatably mounted on said second set of bearing members, one roller to each bearing member, the rollers of said fourth set thereof being adapted to roll on a fourth surface of said track member which is substantially parallel to said third planar surface, said third planar surface and said fourth surface being opposed faces of a part of said track member which provides compression reaction between said faces.

Each said resiliently mounted bearing member may comprise a lever pivotally mounted by one end on a bracket secured to the carrier, the other end of said lever being connected to said carrier by a helical tension spring. A roller of the second or fourth set thereof is rotatably mounted on each lever.

The guide means may also comprise a track member providing said first and third planar surfaces and said second and fourth surfaces. The track member may be a rolled steel joist of I section, or a composite beam comprising two or more rolled steel joists of channel or I section, and said first and third planar surfaces are provided by the outer face and one edge of one flange of a said joist.

Figure 2:
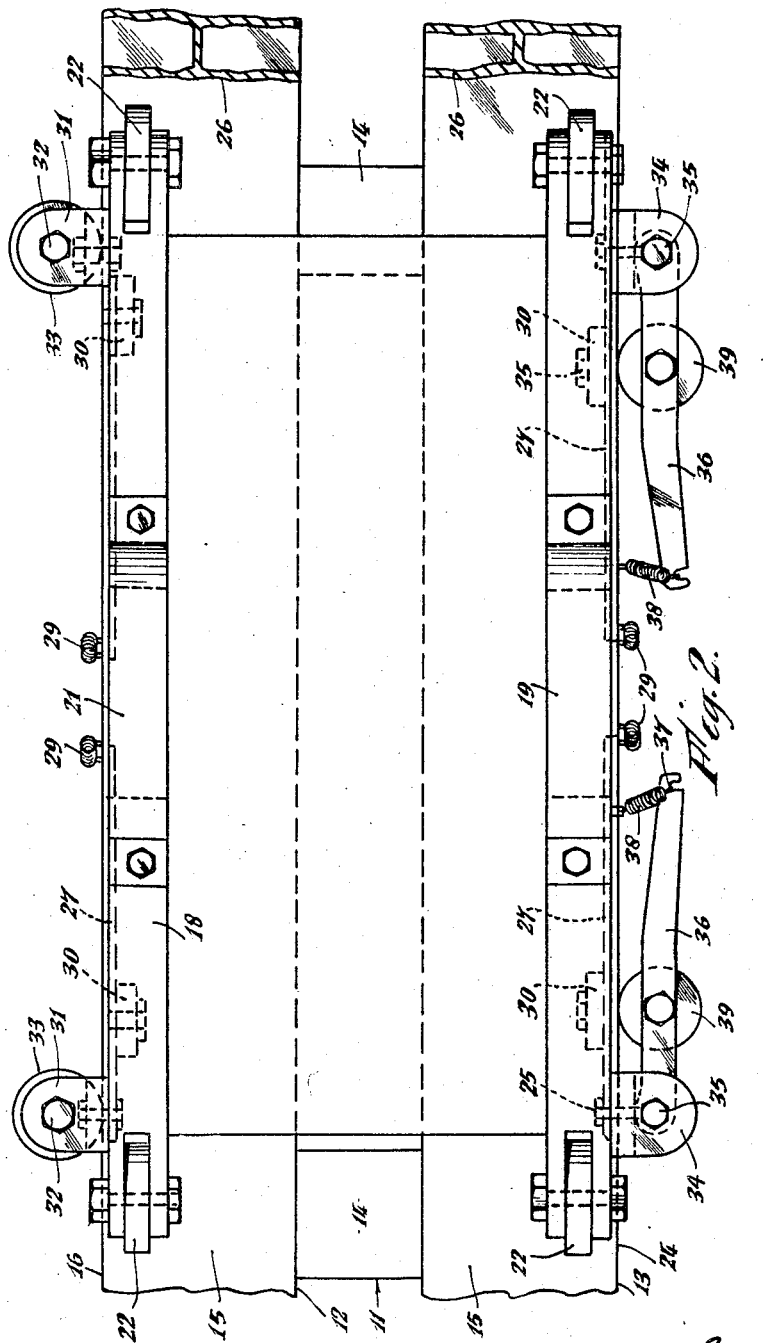
Figure 3:
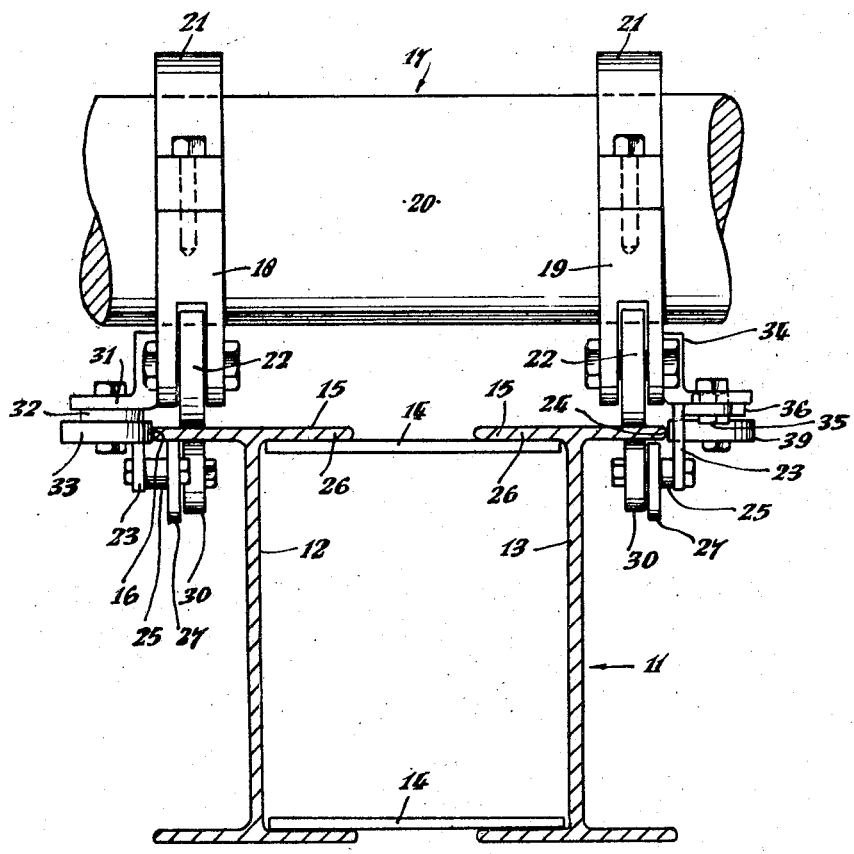

One form of guide means according to this invention is illustrated in the accompanying drawings, wherein:

Fig. 1 is a side elevation,
Fig. 2 is a plan view, and
Fig. 3 is a sectional transverse elevation taken on line III—III of Fig. 1.

A track member is provided by a composite beam 11 formed of two rolled steel joists 12, 13 of I section which are secured rigidly together by transverse braces 14. The upper faces 15 of the top flanges 26 of the two joists are planed so as to be perfectly planar and both are disposed in one common plane which, in use, will be substantially horizontal. The outer edge 16 of the upper flange of the joist 12 also is planed so as to be perfectly planar and is perpendicular to the planar surface 15 so that, in use, said surface 16 is substantially vertical. All other faces and edges of the two rolled steel joists are retained in their rough rolled condition.

A carrier 17 comprises two side plates 18, 19 with a shaft 20 disposed therebetween and rigidly secured thereto by caps 21. A machine tool (not shown), which may be a sawing machine, is mounted rigidly on the shaft 20.

At both ends of each side plate 18 and 19 rollers 22 are rotatably mounted on parallel axes, which axes are disposed transversely of the plates 18, 19, so that all four rollers 22 may run on the planar surface 15. For convenience of description the axes of the said rollers 22 will be described herein as being horizontal, and the orientation of all other parts of the apparatus will be described in relation to said horizontal axes.

Brackets 23 are rigidly secured to the outer faces of the two side plates 18 and 19, which plates are substantially vertical, the brackets 23 being so arranged that they depend vertically outwardly of the outer edges 16 and 24 of the top flanges of the two joists 12, 13. Horizontal pivot pins 25, which are parallel with the axes of the rollers 22, are secured to the bottom ends of the brackets 23, and levers 27 are pivotally mounted on said pivot pins. The levers 27 extend longitudinally of the apparatus and their ends 28, remote from the pivots 25, are connected to the carrier side plates 18, 19 by helical tension springs 29. Rollers 30 are mounted rotatably on the levers 27 on horizontal axes which are parallel to the axes of the rollers 22, one roller on each lever, the arrangement being such that when the rollers 22 roll on the planar surface 15 formed by the top surfaces of the top flanges 26 of the joists 12, 13, the rollers 30 will roll on the under faces of the said flanges and will be held resiliently against said flange faces by the springs 29.

Brackets 31 are secured rigidly to the outer face of the side plate 18, at or near both ends of said plate, and said brackets carry vertical depending pivot pins 32 on which rollers 33 are rotatably mounted, the arrangement being such that when the rollers 22 roll on the horizontal planar surface 15 the rollers 33 will roll on the vertical planar surface 16.

Brackets 34 are rigidly mounted on the outer face of the side plate 19, at or near each end of said plate, and said brackets carry vertical depending pivot pins 35. Levers 36 are pivotally mounted at one end of each lever, on said pivot pins 35, and the other ends 37 of said levers are connected to the side plate 19 by helical tension springs 38. Rollers 39 are rotatably mounted, on vertical axes, on the levers 36, one roller on each lever, the arrangement being such that when the rollers 33 roll on the vertical planar surface 16 the rollers 39 roll on the outer edge 24 of the top flange 26 of the joist 13 and are held resiliently against said edge 24 by the springs 38.

In use, the carrier 17 is mounted on the beam 11 with the rollers 22 on the planar surface 15, the rollers 33 abutting the planar surface 16, the rollers 30 abutting the outer under faces of the top flanges 26, and the rollers 39 abutting the edges 24 of the joist 13. Thereby, the carrier 17 is securely mounted on the beam which applies compression reaction between the rollers 22 and 30, and between the rollers 33 and 39.

The machine tool is rigidly mounted on the carrier 17.

When the carrier 17 is moved along the beam 11, by any suitable means, the operative part of the machine tool, which may be a saw, will travel in a straight line, such straight line being determined by the planar surfaces 15 and 16.

It will be seen that the carrier may be mounted on a track member which may have no machined surfaces other than the two planar surfaces 15 and 16. Consequently, a comparatively cheap and easily constructed track member may be used.

It will be obvious that the beam 11 may comprise two channel section joists, or that it may comprise a single I section joist.

What I claim and desire to secure by Letters Patent is:

1. Means for guiding a machine tool along a straight path, comprising a carrier adapted for a machine tool to be mounted thereon, a track member having first and third planar surfaces and second and fourth surfaces, a first set of rollers rotatably mounted on said carrier on parallel axes which are fixed relatively to the said carrier, all of said rollers being adapted to roll on said first planar surface, a first set of bearing members resiliently mounted on said carrier and providing axes which are parallel with and resiliently urged towards the axes of said first set of rollers, a second set of rollers rotatably mounted on the axes provided by said first set of bearing members, one roller to each bearing member, the rollers of said second set being adapted to roll on said second surface of said track member which is immovable relatively to and substantially parallel with said first planar surface, a third set of rollers rotatably mounted on said carrier on parallel axes which are fixed relatively to the said carrier, the axes of said third set of rollers being perpendicular to the axes of said first set of rollers, said third set of rollers being adapted to roll on said third planar surface on the said track member which is perpendicular to said first planar surface, a second set of bearing members resiliently mounted on said carrier and providing axes which are parallel with and resiliently urged towards the axes of said third set of rollers, and a fourth set of rollers rotatably mounted on said second set of bearing members, one roller to each bearing member, the rollers of said fourth set being adapted to roll on said fourth surface of said track member which is immovable relatively to and substantially parallel with said third planar surface.

2. Means according to claim 1 wherein each said resiliently mounted bearing member comprises a lever pivotally mounted by one end on a bracket secured to the carrier, the other end of said lever being connected to said carrier by a helical tension spring, and a roller of the second and fourth sets thereof being rotatably mounted on each lever.

3. Means according to claim 1 wherein said track member comprises a rolled steel joist of I section.

4. Means according to claim 1 wherein said track member is a composite beam comprising at least two rolled steel joists.

References Cited in the file of this patent

UNITED STATES PATENTS

| | | |
|---|---|---|
| 1,507,771 | Ferris | Sept. 9, 1924 |
| 1,841,032 | Hutchinson | Jan. 12, 1932 |
| 1,923,853 | Van Duyn | Aug. 22, 1933 |
| 2,118,514 | Johnson | May 24, 1938 |

FOREIGN PATENTS

| | | |
|---|---|---|
| 464,431 | Germany | Aug. 17, 1928 |